United States Patent
Kuo et al.

(10) Patent No.: US 8,873,420 B2
(45) Date of Patent: Oct. 28, 2014

(54) DETECTING EXTENDED ACQUISITION INDICATORS

(71) Applicant: Broadcom Corporation, Irvine, CA (US)

(72) Inventors: Chun-Hsuan Kuo, San Diego, CA (US); Li Fung Chang, Holmdel, NJ (US)

(73) Assignee: Broadcom Corporation, Irvine, CA (US)

( * ) Notice: Subject to any disclaimer, the term of this patent is extended or adjusted under 35 U.S.C. 154(b) by 93 days.

(21) Appl. No.: 13/645,723

(22) Filed: Oct. 5, 2012

(65) Prior Publication Data

US 2013/0142061 A1    Jun. 6, 2013

Related U.S. Application Data

(60) Provisional application No. 61/565,864, filed on Dec. 1, 2011, provisional application No. 61/568,868, filed on Dec. 9, 2011.

(51) Int. Cl.
*H04L 12/26* (2006.01)

(52) U.S. Cl.
USPC .......................................... 370/252; 370/465

(58) Field of Classification Search
USPC .............. 370/252, 241.1, 242, 244–245, 326, 370/328–330, 335–336, 338, 342–343, 345, 370/389, 392, 400–401, 465, 478–480, 498
See application file for complete search history.

(56) References Cited

U.S. PATENT DOCUMENTS

| 6,643,318 B1 * | 11/2003 | Parsa et al. ................... 375/141 |
| 7,957,758 B2 | 6/2011 | Soerensen et al. |
| 8,179,946 B2 | 5/2012 | Roberts et al. |
| 8,320,318 B2 * | 11/2012 | Baker et al. ................... 370/329 |
| 8,670,509 B2 | 3/2014 | Sollenberger et al. |
| 2001/0040916 A1 | 11/2001 | Sato |
| 2004/0081115 A1 * | 4/2004 | Parsa et al. ................... 370/320 |
| 2004/0199858 A1 | 10/2004 | Becker et al. |
| 2004/0264497 A1 * | 12/2004 | Wang et al. ................... 370/465 |
| 2005/0113087 A1 | 5/2005 | Rick et al. |
| 2007/0165567 A1 * | 7/2007 | Tan et al. ...................... 370/329 |
| 2007/0243848 A1 | 10/2007 | Behzad |

(Continued)

FOREIGN PATENT DOCUMENTS

| KR | 10-2010-0085132 | 7/2010 |
| KR | 10-2011-0000685 | 1/2011 |

OTHER PUBLICATIONS

Dielissen, et al., "State Vector Reduction for Initailization of Sliding Windows Map," Proc 2nd International Symposium on Turbo Codes & Related Topics, Sep. 2000, pp. 387-390.

*Primary Examiner* — Kevin Mew (74) *Attorney, Agent, or Firm* — McDermott Will & Emery LLP (57) ABSTRACT

A wireless communication device receives acquisition indicator (AI) data, including an acquisition indicator (AI), a corresponding AI signature, and a corresponding plurality of extended AI indicators (EAI). The device determines whether channel power corresponding to the received AI signature exceeds a first negative limit. The device determines whether a reliability metric of the extended acquisition indicators exceeds a second limit. If the channel power does not exceed the first negative limit and the reliability metric does not exceed the second limit, the device declares the AI to be an indeterminate indicator that denotes neither acknowledgment nor denial of an access request associated with the received AI data.

20 Claims, 4 Drawing Sheets (56) References Cited

U.S. PATENT DOCUMENTS

| | | | |
|---|---|---|---|
| 2008/0298325 A1* | 12/2008 | Vujcic | 370/336 |
| 2009/0175205 A1 | 7/2009 | Mathew et al. | |
| 2009/0207746 A1 | 8/2009 | Yuan et al. | |
| 2009/0225918 A1 | 9/2009 | Telukuntla et al. | |
| 2009/0252125 A1* | 10/2009 | Vujcic | 370/336 |
| 2011/0064122 A1 | 3/2011 | Hahm et al. | |
| 2011/0280210 A1* | 11/2011 | Zhang et al. | 370/329 |
| 2012/0134293 A1 | 5/2012 | Nistor et al. | |
| 2013/0114518 A1* | 5/2013 | Martin et al. | 370/329 |
| 2013/0141257 A1 | 6/2013 | Chiu et al. | |
| 2013/0142057 A1 | 6/2013 | Molev-Shteiman | |
| 2013/0142223 A1 | 6/2013 | Kuo | |
| 2013/0143554 A1 | 6/2013 | Hahm et al. | |
| 2013/0143577 A1 | 6/2013 | Chiu et al. | |
| 2013/0143605 A1 | 6/2013 | Chiu et al. | |
| 2013/0170444 A1* | 7/2013 | Pani et al. | 370/329 |
| 2013/0301581 A1* | 11/2013 | Johansson et al. | 370/329 |
| 2013/0322386 A1* | 12/2013 | Zhang et al. | 370/329 |

* cited by examiner

DETECTING EXTENDED ACQUISITION INDICATORS

CROSS REFERENCE TO RELATED APPLICATIONS

This application claims the benefit of U.S. Provisional Application No. 61/565,864, filed Dec. 1, 2011, titled Cellular Baseband Processing." This application also claims the benefit of benefit of U.S. Provisional Application No. 61/568,868, filed Dec. 9, 2011, titled Cellular Baseband Processing." Each of these applications is hereby incorporated by reference herein in its entirety.

BACKGROUND

Cellular wireless communication systems support wireless communication services in many populated areas of the world. While cellular wireless communication systems were initially constructed to service voice communications, they are now called upon to support data communications as well. The demand for data communication services has exploded with the acceptance and widespread use of the Internet. While data communications have historically been serviced via wired connections, cellular wireless users now demand that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices. The demand for increased bandwidth and more features in wireless data communications is expected increase over time.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates cellular wireless communications, and more specifically to determining whether a request, made by a wireless communication device, to access a shared transport channel was acknowledged by a base station.

Figure 1:
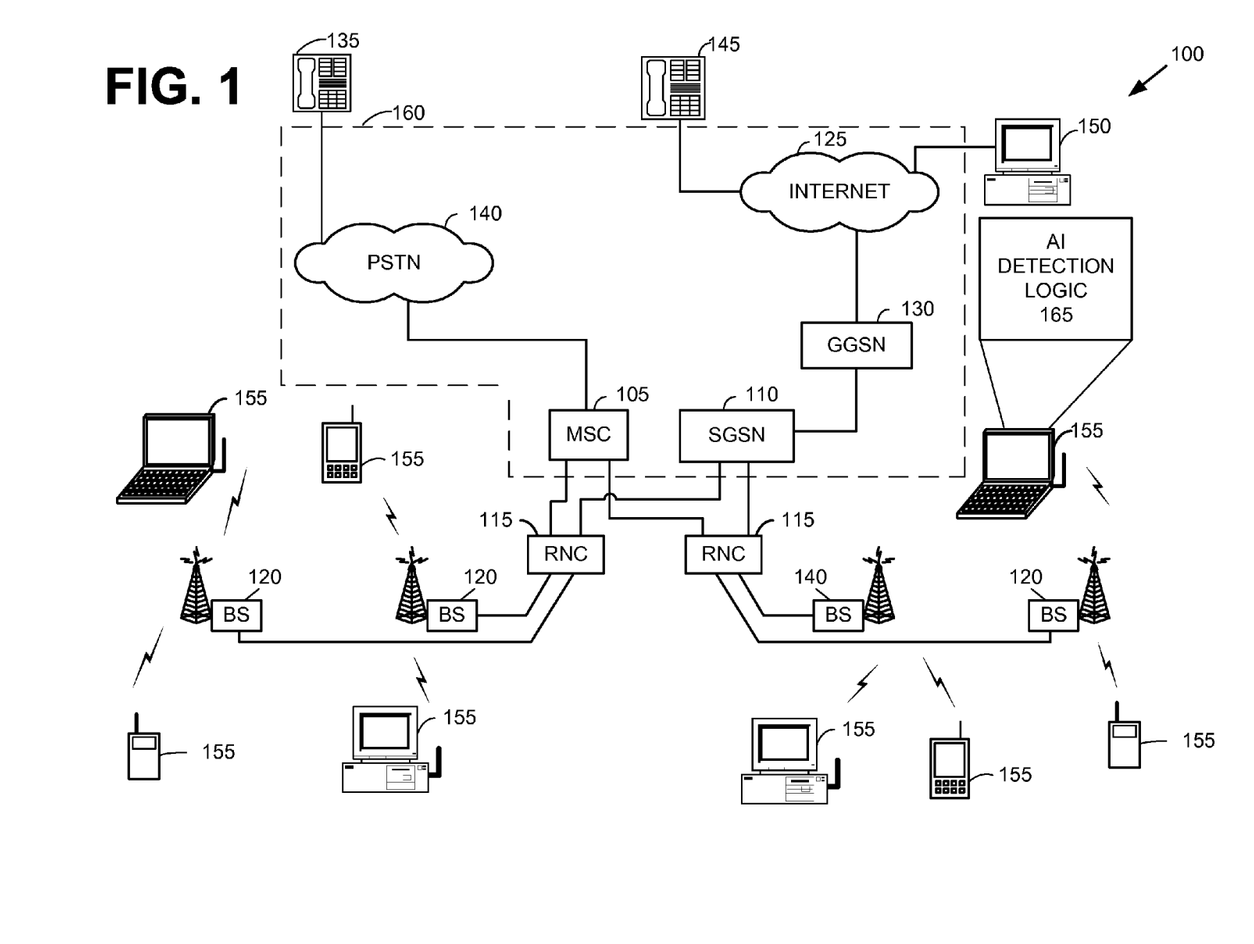
FIG. 1 is a diagram illustrating a system that supports wireless devices according to some embodiments disclosed herein.

FIG. 1 is a system diagram illustrating a portion of a cellular wireless communication system 100 that supports wireless communication devices operating according to some embodiments of the present disclosure. In some embodiments, the cellular wireless communication system 100 supports the 3rd Generation Partnership Project (3GPP) standard known as Universal Terrestrial Radio Access (UTRA), which utilizes Wideband Code Division Multiple Access (W-CDMA) radio access technology.

The cellular wireless communication system 100 includes a Mobile Switching Center (MSC) 105, Serving GPRS Support Node (SGSN) 110, radio network controllers (RNCs) 115, and base stations 120. The SGSN 110 couples to the Internet 125 via a Gateway GPRS Support Node (GGSN) 130. A conventional voice terminal 135 couples to the Public Switched Telephone Network (PSTN) 140. A Voice over Internet Protocol (VoIP) terminal 145 and a personal computer 150 couple to the Internet 125. The MSC 105 couples to the PSTN 140.

Each of the base stations 120 services a cell/set of sectors within which it supports wireless communications. Wireless links that include both forward link components and reverse link components support wireless communications between the base stations 120 and their serviced wireless terminals. These wireless links support digital data communications, VoIP communications, and other digital multimedia communications. The cellular wireless communication system 100 may also be backward compatible in supporting analog operations as well.

The cellular wireless communication system 100 also includes wireless communication devices 155 that couple to the cellular wireless communication system 100 via wireless links with the base stations 120. Thus, the base stations 120 couple the wireless communication devices 155 to the radio network controllers 115, which in turn couple to the core network 160.

The wireless communication devices 155 operate in the role of a user element (UE) as described in the various 3GPP standards, and a wireless communication device 155 may therefore be referred to as a UE herein. The wireless communication devices 155 may take various forms, such as cellular telephones, tablet computers, notebook computers, laptop computers, and desktop computers, as may be appreciated. The cellular wireless communication system 100 supports communications with other types of wireless terminals as well.

As is generally known, the wireless communication devices 155 may be enabled to "surf" the Internet, to transmit and receive data communications such as email, transmit and receive files, and to perform other data operations. To support Internet access and other data services, various embodiments of the wireless communication devices 155 implement the 3GPP High Speed Packet Access (HSPA) standard. HSPDA includes High-Speed Uplink Packet Access (HSUPA) and High-Speed Downlink Packet Access (HSDPA), which defines sets of channels and procedures that enable high-speed packet data transmission on the uplink and downlink, respectively.

Packets originating from or destined from a wireless communication device 155 (i.e., a User Element or UE) are conveyed on transport channels. These packets may carry voice, video, or data. The transport channels are mapped to physical channels at the physical layer. The physical channels may use different channel codes to be orthogonal to one other in the code domain. Embodiments of wireless communication device 155 include acquisition indicator (AI) detection logic 165 that is used in conjunction with high speed packet access. The operation of AI detection logic 165 will be described in further detail below, but first a brief discussion of channel usage by the wireless communication device 155 will be provided.

Figure 2:
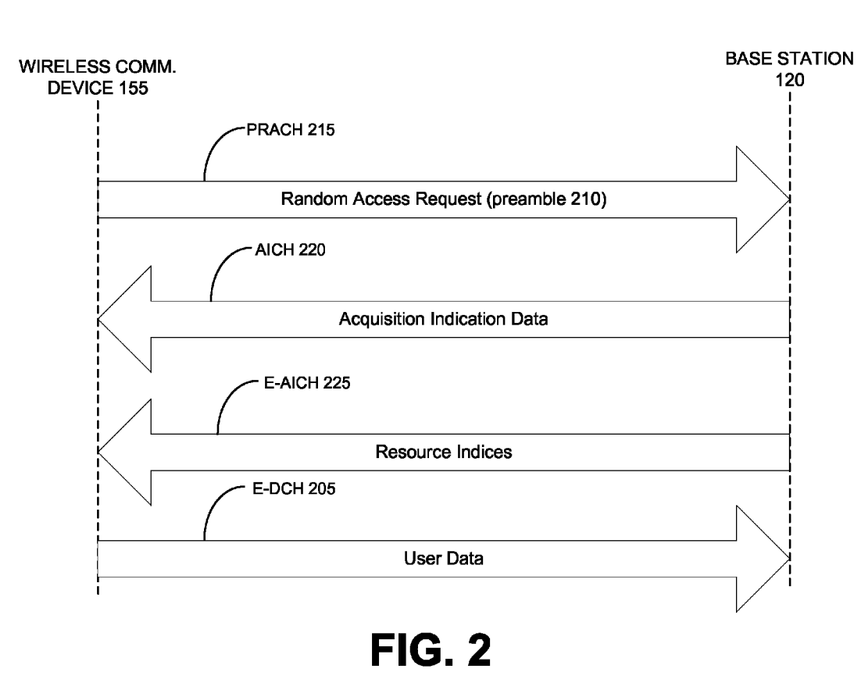
FIG. 2 is a diagram illustrating transport and physical channel usage by a wireless communication device as shown in FIG. 1, according to some embodiments disclosed herein.

FIG. 2 is a diagram illustrating transport and physical channel usage by a wireless communication device 155 according to some embodiments disclosed herein. A wireless communication device 155 may operate in various modes and states. In some states, such as the CELL_FACH state, no dedicated physical channels are allocated to the wireless communication device 155, and instead a default common or shared transport channel is used for uplink transmission. The common transport channel is referred to as the Enhanced Dedicated Channel (E-DCH) 205. As shown in FIG. 2, before using the E-DCH 205 to transmit data in the user plane, the wireless communication device 155 requests access to the E-DCH 205 by first transmitting an access preamble 210 to the base station 120 on an uplink physical channel referred to as the physical random access channel (PRACH) 215. In response, the base station 120 transmits, on a physical downlink channel referred to as the acquisition indicator channel (AICH) 220, an indication of whether the request was granted, along with configuration information about resources allocated by the base station 120 to the wireless communication device 155. These resources may include, for example, power, time slots, and code resources. The code resources may be allocated from a common pool of codes assigned to the E-DCH 205. The wireless communication device 155 then uses the allocated resources to avoid collisions while transmitting user data on the E-DCH 205.

More specifically, a wireless communication device 155 requests access to the E-DCH 205 by transmitting the access preamble 210 in a randomly selected access slot of the PRACH 215. The base station 120 replies with an acquisition indicator (AI) in a corresponding access slot of the AICH 220. The base station 120 also transmits, in the corresponding access slot of an Extended AICH (E-AICH) 225, information that encodes allocated transmission resources. In some embodiments, this encoded information includes an index into a predefined resource table.

The AI detection logic 165 processes the acquisition indicator data received on the AICH 220 to classify the result of the access request. As will be described in further detail below, the AI detection logic 165 declares the access request to be positively acknowledged, to be negatively acknowledged, or to be an indeterminate state denoting neither positive nor negative acknowledgement. If the AI detection logic 165 declares the positively acknowledged state, then other components in the wireless communication device 155 may use the allocated transmission resources to transmit user data on the E-DCH 205. In particular, if the AI detection logic 165 declares the positively acknowledged state, then the transmitter in the wireless communication device 155 sends the user data using a power level which is calculated from the level used to send the last access preamble 210.

On the other hand, if the AI detection logic 165 declares the negatively acknowledged state, the physical layer of the wireless communication device 155 ceases transmission and hands back control to the media access control (MAC) layer. The wireless communication device 155 eventually regains access according to a MAC procedure defined by the 3GPP standard that is based on persistence probabilities.

If the AI detection logic 165 declares an indeterminate state, then the wireless communication device 155 assumes that the base station 120 did not receive the preamble, and uses open loop power control to transmit another access preamble 210.

As should be understood, a detection scheme has some probability of falsely detecting AI, $P_{fEAI}$. Such a false detection results in improperly decoding the allocated transmission resources. (More specifically, false detection of EAI results in decoding the wrong E-DCH resource configuration index.) Using improper transmission resources when transmitting user data in turn results in errors at the receiver. Thus, it is desirable to reduce $P_{fEAI}$.

Using the techniques disclosed herein, AI detection logic 165 reduces $P_{fEAI}$ as compared to conventional techniques. Conventional AI detection techniques use a comparison of the channel power of the AI signature to a threshold which represents the total channel power of the received AI signatures. Embodiments of the AI detection logic 165 disclosed herein use an additional threshold comparison that is related to a reliability metric of the extended AIs. Depending on the results of the additional comparison, the AI detection logic 165 declares either a Negatively Acknowledged state or an indeterminate (non-declaring) state. The indeterminate state signifies that the AI detection logic 165 was unable to decode the EAI. As noted above, the transmitter in the wireless communication device 155 reacts to the indeterminate state by adjusting the power level for the next access preamble 210.

The wireless communication device 155 includes control logic, power control circuitry, a symbol decoder, a transceiver, and AI detection logic 165. As noted above, the wireless communication device 155 receives, on the acquisition indicator channel (AICH) 220, a response to an access request. The symbol decoder decodes the symbols carried on the AICH 220 into data, and provides the decoded data values to the control logic. The symbol decoder also provides the control logic with one or more parameters associated with the decoded data values. The parameters may include, for example, channel power of particular decoded value, and a reliability metric for a particular decode value.

The control logic provides the decoded AICH data and the metrics to the AI detection logic 165. The AI detection logic 165 uses the decoded AICH data and associated parameters to decide the disposition of the access request. In particular, the AI detection logic 165 uses the parameters to determine whether the access request was positively acknowledged, negatively acknowledged, or is an indeterminate state denoting neither acknowledgement nor denial. The AI detection logic 165 declares the access request to be in one of these three states, and provides this determination to the control logic. In some embodiments, two states are determined, one for the Acquisition Indicator (AI) and one for the Extended Acquisition Indicator, where the states are independent of each other.

The control logic uses the state(s) of the access request to control the power of the transceiver. More specifically, if the access request was determined to be in the indeterminate state (denoting neither acknowledgment nor denial), the control logic directs the power control circuitry to reduce power to the transceiver. This may be achieved, for example, by having the control logic provide a power ramp input to the power control circuitry in response to the AI detection logic 165 detecting an indeterminate state, where the power ramp input results in an increase of power to the transceiver.

Figure 3:
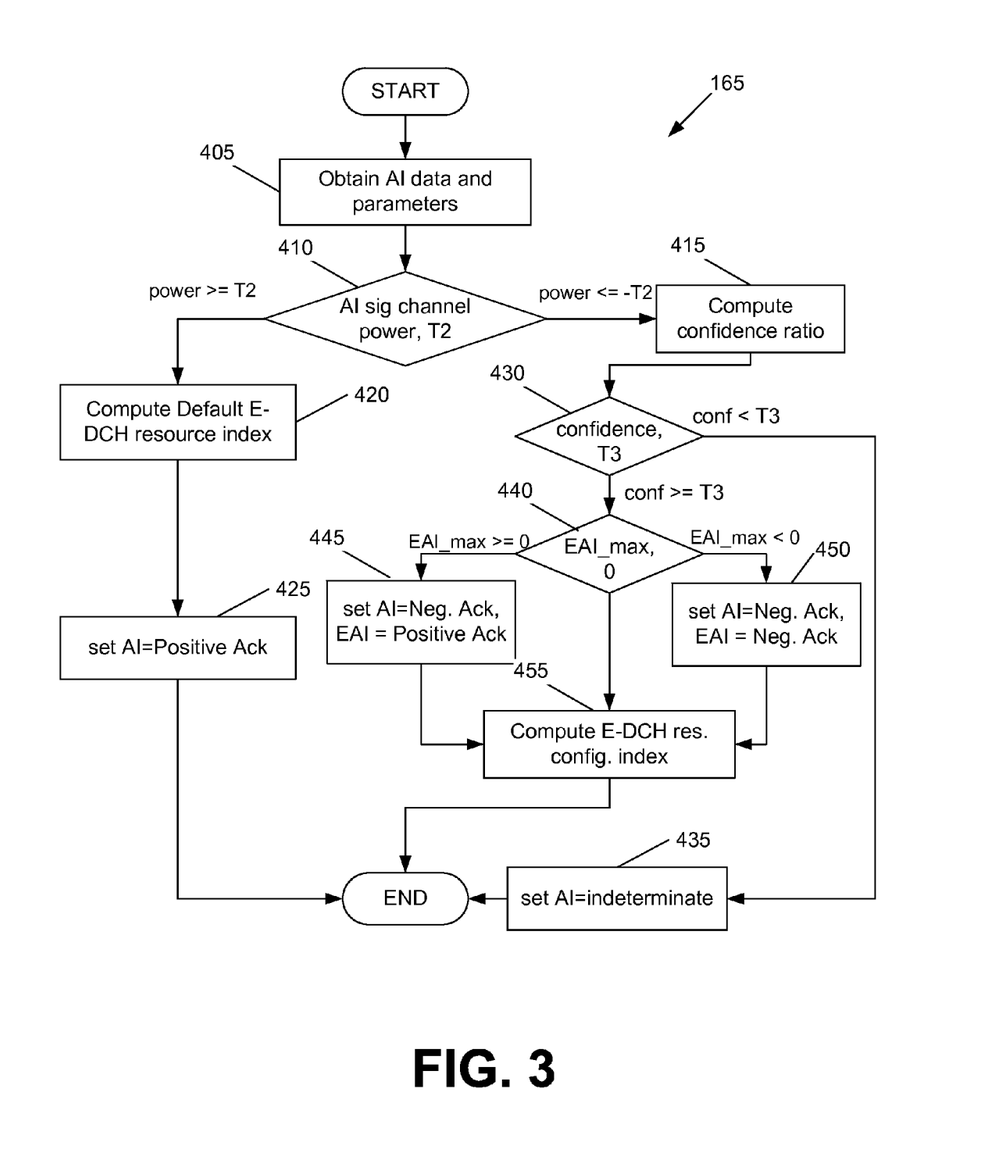
FIG. 3 is a flowchart illustrating operation of acquisition indication logic residing within a communication device as shown in FIG. 1, according to some embodiments disclosed herein.

FIG. 3 is a flowchart illustrating the operation of the AI detection logic 165 (FIG. 1) according to some embodiments disclosed herein. Alternatively, the flowchart of FIG. 3 may be viewed as implementing various steps of a method performed by AI detection logic 165. The process of FIG. 3 may be triggered by receipt of data on the acquisition indicator channel (AICH) 220 (FIG. 2), which in turn occurs in response to an access request to the base station 120 (FIG. 1) made by the wireless communication device 155 (FIG. 1).

Starting at box 305, the AI detection logic 165 obtains decoded data carried on the AICH 220, as well as various parameters associated with the decoded data. As noted above, this data and parameters may be provided by the symbol decoder, either directly or via the control logic. The AICH data obtained at box 305 includes an acquisition indicator (AI), a corresponding AI signature, and a set of extended acquisition indicators (EAIs).

At box 310, the AI detection logic 165 examines the AI obtained at box 305 and determines the AI signature that corresponds to this AI. The AI detection logic 165 then compares the channel power of this AI signature (also obtained at box 305) to a first predefined limit. The first predefined limit represents the total channel power of the received AI signatures. In some embodiments, this total power is computed as the sum of the channel power of all received AI signatures. The sum may be scaled by a power offset. In some embodiments, the first predefined limit used at box 310 corresponds to the T2 parameter described in the 3GPP physical layer specification.

If at box 310 it was determined that the channel power of the received AI signature does not exceed the negative of the first predefined limit (e.g., −T2), then the AI detection logic 165 proceeds to box 315, where a further comparison will be made before, to take into account reliability of the received EAI data, before determining the disposition of the access request. If, however, at box 310 it was determined that the channel power of the received AI signature does exceed the first predefined limit (e.g., T2), then the AI detection logic 165 determines the disposition of the access request without taking into account EAI reliability. To this end, the AI detection logic 165 proceeds to box 320, where the default E-AICH resource index is computed from information received on the AICH 220, and then to box 325, where the AI detection logic 165 determines the disposition of the access request by declaring AI to be a Positive Acknowledgement. In some embodiments, a declaration of Positive Acknowledgement equates to a numeric value of +1. Having declared a value for AI, the process of FIG. 3 is complete.

As noted above, if the channel power of the received AI signature <=−T2, then the AI detection logic 165 performs additional comparisons which take into account reliability of the received EAI data. To this end, at box 315, the AI detection logic 165 computes an EAI confidence value which uses a ratio of selected ones of the extended acquisition indicators obtained at box 305. In some embodiments, the extended AIs having the highest and second highest absolute values are selected, such that the ratio computed at box 315 is abs(EAI_$2^{nd}$_highest/EAI_max). The confidence value may then be computed as the ratio subtracted from 1.0 (e.g., 1.0−ratio).

At box 330, the AI detection logic 165 compares the EAI confidence value computed at box 315 to another predefined limit, referred to herein as T3. This predefined limit T3 may be empirically determined to achieve a desired rate of false positive detections for EAI ($P_{fEAI}$). For example, the ratio of $E_{c\_AICH}$ to $I_{or}$ (in db) may be plotted using different values for T3, and the T3 which produces an acceptable tradeoff between false positives and power usage may be selected as the threshold confidence value for box 330.

If at box 330 it is determined that the confidence ratio for the received EAIs (computed at box 315) is less than the T3 threshold, no further comparison related to reliability of EAI data are needed to determine the disposition of the access request. Processing thus continues at box 335, where the AI detection logic 165 determines the disposition of the access request by declaring AI to be Indeterminate. In some embodiments, a declaration of Indeterminate equates to a numeric value of 0. Having declared a value for AI, the process of FIG. 3 is complete.

If at box 330 it is instead determined that the confidence ratio for the received EAIs (computed at box 315) is >=T3, an additional comparison related to reliability of EAI data is performed to determine the disposition of the access request. To this end, processing continues at box 340, where the sign of the EAI having the largest absolute value (EAI_max) is considered. If EAI_max<0, then at box 345 the AI detection logic 165 determines the disposition of the access request by declaring AI to be a Negative Acknowledgement and EAI to be a Positive Acknowledgement. On the other hand, if EAI_max>=0, then at box 350 the AI detection logic 165 determines the disposition of the access request by declaring AI to be a Negative Acknowledgement and EAI to be a Positive Acknowledgement. Thus, AI is set to Negative Acknowledgement regardless of EAI_max, but the sign of EAI_max determines the setting for EAI. In some embodiments, Negative Acknowledgement may correspond to a numeric value of −1 and Positive Acknowledgement may correspond to a numeric value of +1.

In either case, at box 355 the AI detection logic 165 computes the E-DCH resource configuration index from information received on the AICH 220. The process of FIG. 3 is then complete.

Figure 4:
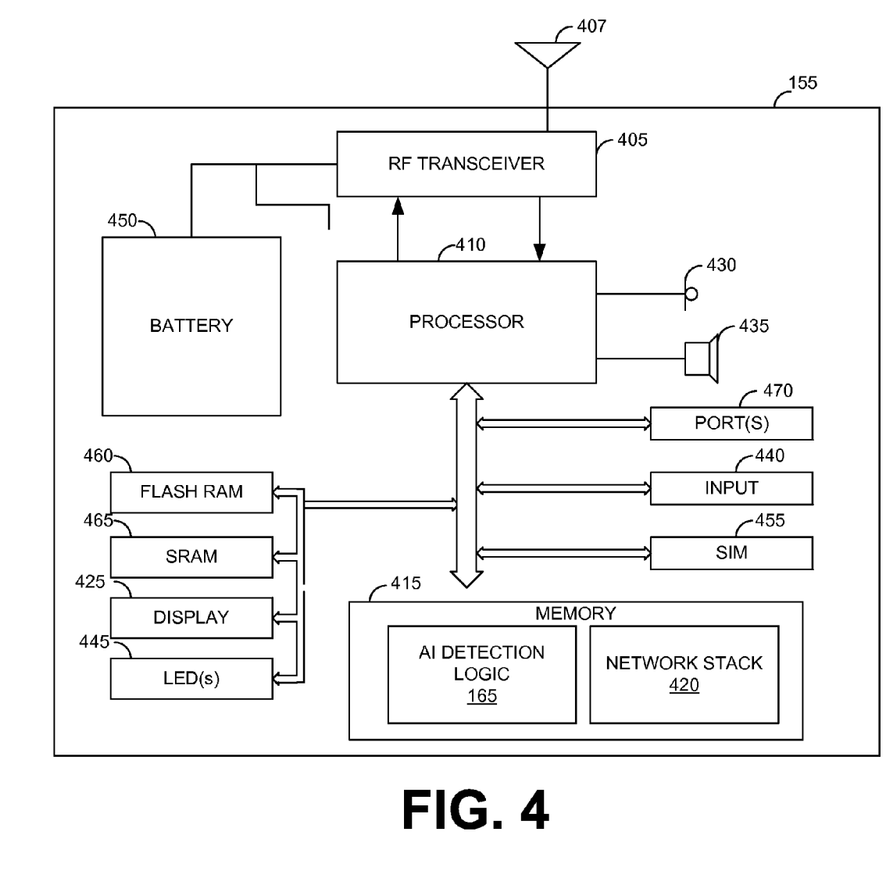
FIG. 4 is a block diagram of a communication device as shown in FIG. 1, according to some embodiments disclosed herein.

FIG. 4 is a block diagram of a wireless communication device 155 according to various embodiments of the present disclosure. Wireless communication device 155 includes an RF transceiver 405, an antenna 407, a processor 410, memory 415, and various other components contained within a housing (not shown). In this example embodiment, AI detection logic 165 and network stack 420 reside in memory 415 and takes the form of instructions executed by processor 410.

One or more layers of network stack 420, for example, the physical layer, media access control (MAC) layer and/or link layer processing, may be implemented in software, and executed by processor 410. Processor 410 may also perform speech coding and decoding, as well as various other functions. Processor 410 may be implemented as a baseband processor, a digital signal processor (DSP), an application processor, a microcontroller, a network processor, or combinations thereof. In some embodiments, processor 410, memory 415, and/or RF transceiver 405 may be integrated on the same chip.

Processor 410 may also interact with the various other systems and components in wireless communication device 155, such as a display 425, microphone 430, speaker 435, user input device 440, LEDs 445 and other components as can be appreciated that might be incorporated into a mobile device. User input device 440 can include a capacitive touchscreen that is integrated within display 425, a keypad, other buttons or switches integrated into mobile wireless computing, or any other user input device as can be appreciated.

Wireless communication device 155 may also include a battery 450 or other power source that can provide power to the various components in the terminal. Wireless communication device 155 may also include one or more Subscriber Identification Module (SIM) port 455, a flash RAM 460, an SRAM 465, or other system resources. Wireless communication device 155 may also include one or more ports 470, which can comprise a universal serial bus (USB) port and its variants (e.g., micro-USB, mini-USB, etc.), a proprietary port, or any other input/output ports that can provide for data operations as well as power supply that can facilitate charging of battery 450.

Any logic or application described herein (including AI detection logic 165) that comprises software or code can be embodied in any non-transitory computer-readable medium for use by or in connection with an instruction execution system such as, for example, processor 410. In this sense, the logic may comprise, for example, statements including instructions and declarations that can be fetched from the computer-readable medium and executed by processor 410. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although AI detection logic 165 and other various components described herein may be embodied in software, firmware, or code executed by a processor as discussed above, as an alternative the same may also be embodied in dedicated hardware or a combination of software, general-purpose hardware, and dedicated hardware. If embodied in dedicated hardware, each can be implemented as a circuit or state machine that employs any one of or a combination of a number of technologies. These technologies may include, but are not limited to, discrete logic, a programmable logic device, an application specific integrated circuit (ASIC), a field programmable gate array (FPGA), a system on chip (SoC), a system in package (SiP), or any other hardware device having logic gates for implementing various logic functions upon an application of one or more data signals, Such technologies are generally well known by those skilled in the art and, consequently, are not described in detail herein.

The diagram of FIG. 4 shows the functionality and operation of an implementation of portions of the AI detection logic 165. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as the processor 410 in a computer system or other system. The machine code may be converted from the source code, etc. If embodied in hardware, each block may represent a circuit or a number of interconnected circuits to implement the specified logical function(s).

Although the diagram of FIG. 4 shows a specific order of execution, it is understood that the order of execution may differ from that which is depicted. For example, the order of execution of two or more blocks may be scrambled relative to the order shown. Also, two or more blocks shown in succession in the diagram of FIG. 4 may be executed concurrently or with partial concurrence. Further, in some embodiments, one or more of the blocks shown in the diagram of FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure. It is understood that the diagram of FIG. 4 merely provide an example of the many different types of functional arrangements that may be employed to implement the operation of portion(s) of the AI detection logic 165 as described herein. As an alternative, the diagrams of diagram of FIG. 4 may be viewed as depicting an example of steps of a method implemented in the AI detection logic 165 according to one or more embodiments.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method comprising:
receiving, at a wireless communication device on a downlink channel, acquisition indicator (AI) data, the AI data comprising an acquisition indicator (AI), a corresponding AI signature, and a corresponding plurality of extended acquisition indicators (EAI);
performing, by the wireless communication device, a first comparison of a channel power corresponding to the received AI signature to a first threshold and a second comparison of a reliability metric of the extended acquisition indicators to a second threshold; and
declaring, by the wireless communication device, the AI to have a state that is indeterminate, positively acknowledged, or negatively acknowledged based at least on the first comparison and the second comparison, wherein the indeterminate AI state denotes neither acknowledgment nor denial of an access request associated with the received AI data.

2. The method of claim 1, further comprising:
reducing transmit power of a subsequent access request by the wireless communication device in response to the indeterminate AI state.

3. The method of claim 1, further comprising:
if the channel power does exceed the first threshold, computing a default enhanced dedicated channel (E-DCH) resource index.

4. The method of claim 1, wherein the indeterminate AI state has a value of zero.

5. The method of claim 1, further comprising:
if the channel power does not exceed the first threshold and the reliability metric does exceed the second threshold, declaring the AI state to be a negative acknowledgement.

6. The method of claim 5, further comprising:
if one of extended acquisition indicators having a highest absolute value is positive, declaring a state of the extended acquisition indicator (EAI) to be a negative acknowledgement.

7. The method of claim 5, further comprising:
if one of extended acquisition indicators having a highest absolute value is negative, declaring a state of the extended acquisition indicator (EAI) to be a positive acknowledgement.

8. The method of claim 5, further comprising:
computing an enhanced dedicated channel (E-DCH) resource index.

9. The method of claim 5, further comprising:
computing an enhanced dedicated channel (E-DCH) resource index based at least in part on a default E-DCH resource index, a total number of E-DCH resources, and a random access preamble signature.

10. The method of claim 1, wherein the reliability metric of the extended acquisition indicators is based at least in part on a ratio of one of the plurality of extended acquisition indicators to another one of the plurality of extended acquisition indicators.

11. The method of claim 10, wherein the ones of plurality of extended acquisition indicators used in the ratio are selected based on absolute value.

12. The method of claim 10, wherein the one of the plurality of extended acquisition indicators has a second largest absolute value and the another one of the plurality of extended acquisition indicators has a largest absolute value.

13. The method of claim 1, wherein the AI data is received on an acquisition indicator channel (AICH).

14. The method of claim 1, wherein the AI data is received in response to a random access request transmitted by the wireless communication device on an uplink channel.

15. A device comprising:
a wireless transceiver;
power control circuitry configured to control power to the wireless transceiver; and
processing circuitry configured to:
receive acquisition indicator (AI) data via the wireless transceiver, the AI data comprising an acquisition indicator (AI), a corresponding AI signature, and a corresponding plurality of extended acquisition indicators (EAI);
determine whether a channel power corresponding to the received AI signature exceeds a first threshold;
determine whether a reliability metric of the extended acquisition indicators exceeds a second threshold; and
provide a power ramp input to the power control circuitry if the channel power does not exceed the first threshold and the reliability metric does not exceed the second threshold,
wherein the power control circuitry increases transmit power to the wireless transceiver in response to the power ramp input.

16. The device of claim 15, the processing circuitry further configured to compute the reliability metric based at least in part on a ratio of selected ones of the plurality of extended acquisition indicators, the selection based on absolute value.

17. The device of claim 15, the processing circuitry further configured to:
compute a first positive limit based on a sum of a plurality of channel powers, each channel power corresponding to one of a plurality of received AI signatures; and
compute the first threshold as a negative of the first positive limit.

18. The device of claim 17, the processing circuitry further configured to:
scale the first positive limit by a power offset parameter.

19. A method comprising:
transmitting a first random access request to a base station of a cellular wireless communication system;
receiving, at a user element (UE) of the cellular wireless communication system, acquisition indicator (AI) data that comprises an acquisition indicator (AI), a corresponding AI signature, and a corresponding plurality of extended acquisition indicators (EAI);
determining, by the UE, whether a channel power corresponding to the received AI signature exceeds a first threshold;
determining, by the UE, whether a reliability metric of the extended acquisition indicators exceeds a second threshold; and
if the channel power does not exceed the first threshold and the reliability metric does not exceed the second threshold, transmitting a second random access request with increased power relative to the first random access request.

20. The method of claim 19, further comprising computing the reliability metric based at least in part on a ratio of selected ones of the plurality of extended acquisition indicators, the selection based on absolute value.

* * * * *